US008896098B2

(12) United States Patent
Yamazaki

(10) Patent No.: US 8,896,098 B2
(45) Date of Patent: Nov. 25, 2014

(54) POWER STORAGE DEVICE AND METHOD FOR MANUFACTURING THE SAME

(75) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 415 days.

(21) Appl. No.: 13/117,315

(22) Filed: May 27, 2011

(65) Prior Publication Data

US 2011/0291240 A1   Dec. 1, 2011

(30) Foreign Application Priority Data

May 28, 2010   (JP) ................................. 2010-123388

(51) Int. Cl.
  *H01L 29/92*    (2006.01)
  *H01M 4/134*    (2010.01)
  *H01M 10/0525*  (2010.01)
  *H01M 4/1395*   (2010.01)

(52) U.S. Cl.
  CPC .......... *H01M 4/134* (2013.01); *H01M 10/0525* (2013.01); *Y02E 60/122* (2013.01); *H01M 4/1395* (2013.01)
  USPC ........... 257/534; 257/737; 257/756; 257/757; 257/E21.008; 438/381; 438/655

(58) Field of Classification Search
  CPC ............. H01L 21/02; H01L 21/28518; H01L 21/76843; H01L 29/456; H01L 21/00; H01L 21/28052; H01L 23/5256; H01L 23/5329; H01L 23/5222; H01M 4/134; H01M 10/0525; H01M 4/1395

USPC .......... 257/534, E21.008, E29.342, 737, 757, 257/756; 438/381, 655

See application file for complete search history.

(56) References Cited

U.S. PATENT DOCUMENTS 5,643,826 A   7/1997   Ohtani et al.
5,705,829 A   1/1998   Miyanaga et al.
(Continued)

FOREIGN PATENT DOCUMENTS

CN   001286811 A   3/2001
CN   001476645 A   2/2004
(Continued)

OTHER PUBLICATIONS

Kamins.T et al., "Ti-catalyzed Si nanowires by chemical vapor deposition: Microscopy and growth mechanisms,", J. Appl. Phys. (Journal of Applied Physics), Jan. 15, 2001, vol. 89, No. 2, pp. 1008-1016.
(Continued)

*Primary Examiner* — Thinh T Nguyen
(74) *Attorney, Agent, or Firm* — Nixon Peabody LLP; Jeffrey L. Costellia

(57) ABSTRACT

To provide a power storage device with improved cycle characteristics and a method for manufacturing the power storage device, a power storage device is provided with a conductive layer in contact with a surface of an active material layer including a silicon layer after an oxide film, such as a natural oxide film, which is formed on the surface of the active material layer is removed. The conductive layer is thus provided in contact with the surface of the active material layer including a silicon layer, whereby the conductivity of the electrode surface of the power storage device is improved; therefore, cycle characteristics of the power storage device can be improved.

22 Claims, 6 Drawing Sheets

(56) References Cited

U.S. PATENT DOCUMENTS

| | | | |
|---|---|---|---|
| 6,165,824 A | 12/2000 | Takano et al. | |
| 6,207,326 B1 * | 3/2001 | Kawakami et al. | 429/231.95 |
| 6,685,804 B1 | 2/2004 | Ikeda et al. | |
| 6,835,496 B1 | 12/2004 | Kaminaka et al. | |
| 6,887,511 B1 | 5/2005 | Shima et al. | |
| 7,015,496 B2 | 3/2006 | Ohnuma et al. | |
| 7,160,646 B2 | 1/2007 | Ohshita et al. | |
| 7,192,673 B1 | 3/2007 | Ikeda et al. | |
| 7,235,330 B1 | 6/2007 | Fujimoto et al. | |
| 7,241,533 B1 | 7/2007 | Ikeda et al. | |
| 7,396,409 B2 | 7/2008 | Hatta et al. | |
| 7,410,728 B1 | 8/2008 | Fujimoto et al. | |
| 7,638,239 B2 * | 12/2009 | Sato et al. | 429/218.1 |
| 7,658,871 B2 * | 2/2010 | Matsubara et al. | 252/519.54 |
| 7,794,881 B1 | 9/2010 | Fujimoto et al. | |
| 8,450,012 B2 * | 5/2013 | Cui et al. | 429/209 |
| 2002/0168574 A1 | 11/2002 | Ahn et al. | |
| 2005/0042128 A1 | 2/2005 | Matsubara et al. | |
| 2005/0048369 A1 * | 3/2005 | Koshina et al. | 429/218.1 |
| 2008/0261112 A1 * | 10/2008 | Nagata et al. | 429/218.1 |
| 2008/0297981 A1 | 12/2008 | Endo et al. | |
| 2009/0169996 A1 * | 7/2009 | Zhamu et al. | 429/221 |
| 2009/0202911 A1 | 8/2009 | Fukuoka et al. | |
| 2010/0124707 A1 * | 5/2010 | Hirose et al. | 429/331 |
| 2010/0209784 A1 | 8/2010 | Yamazaki et al. | |
| 2010/0330423 A1 * | 12/2010 | Cui et al. | 429/220 |
| 2011/0151290 A1 | 6/2011 | Cui et al. | |
| 2011/0159365 A1 * | 6/2011 | Loveness et al. | 429/218.1 |

FOREIGN PATENT DOCUMENTS

| | | |
|---|---|---|
| CN | 101504980 A | 8/2009 |
| EP | 1028476 A | 8/2000 |
| EP | 2088221 A | 8/2009 |
| JP | 07-130652 | 5/1995 |
| JP | 07-183535 | 7/1995 |
| JP | 07-183536 | 7/1995 |
| JP | 07-183537 | 7/1995 |
| JP | 10-247735 | 9/1998 |
| JP | 2000-243395 A | 9/2000 |
| JP | 2001-210315 | 8/2001 |
| JP | 2002-083594 | 3/2002 |
| JP | 2003-246700 | 9/2003 |
| JP | 2004-224575 | 8/2004 |
| JP | 2004-281317 | 10/2004 |
| JP | 2005-071772 | 3/2005 |
| JP | 2007-299580 | 11/2007 |
| JP | 2008-294314 | 12/2008 |

OTHER PUBLICATIONS

Kohno.H et al., "Silicon Nanoneedles Grown by a Simple Thermal Treatment Using Metal-Sulfur Catalysts,", Jpn. J. Appl. Phys. (Japanese Journal of Applied Physics), Feb. 1, 2002, vol. 41, Part 1, No. 2A, pp. 577-578.

Cui.L et al., "Crystalline-Amorphous Core-Shell Silicon Nanowires for High Capacity and High Current Battery Electrodes,", Nano Letters, 2009, vol. 9, No. 1, pp. 491-495.

Chinese Office Action (Application No. 201110152152.X) dated Aug. 20, 2014.

* cited by examiner

POWER STORAGE DEVICE AND METHOD FOR MANUFACTURING THE SAME

BACKGROUND OF THE INVENTION

1. Field of the Invention

The present invention relates to a power storage device and a method for manufacturing the power storage device.

Note that the power storage device indicates all elements and devices which have a function of storing power.

2. Description of the Related Art

In recent years, power storage devices such as lithium-ion secondary batteries, lithium-ion capacitors, and air cells have been developed.

An electrode for the power storage device is manufactured by providing an active material over one surface of a current collector. As the active material, a material which can occlude and release ions which function as carriers, such as carbon or silicon, is used. In particular, silicon or phosphorus-doped silicon has larger theoretical capacity than carbon, and the use of these materials as the active material is preferable in terms of larger capacity of a power storage device (e.g., see Patent Document 1).

REFERENCE

[Patent Document 1] Japanese Published Patent Application No. 2001-210315

SUMMARY OF THE INVENTION

However, when silicon is formed on the surface of the current collector, an oxide film, such as a natural oxide film, having low conductivity is formed on the silicon surface. When silicon is used for a negative electrode active material, the function of the electrode might decrease because the oxide film, such as a natural oxide film, having low conductivity which is formed on the silicon surface, is overloaded at the time of charge and discharge. Accordingly, improvement in cycle characteristics of the power storage device has been hindered.

Thus, an object of one embodiment of the present invention is to provide a power storage device with improved cycle characteristics and a method for manufacturing the power storage device.

According to one embodiment of the present invention, a power storage device is provided with a conductive layer in contact with a surface of an active material layer after an oxide film, such as a natural oxide film, which is formed on the surface of the active material layer is removed.

One embodiment of the present invention is a power storage device including a current collector, a silicon layer over the current collector, and a conductive layer which is on and in contact with the silicon layer.

Another embodiment of the present invention is a method for manufacturing a power storage device in which a silicon layer is formed over a current collector, a natural oxide film which is on and in contact with the silicon layer is removed, and a conductive layer is formed on and in contact with the silicon layer.

In the above power storage device, the conductive layer preferably includes one or more of copper, nickel, titanium, manganese, cobalt, and iron. Also, the conductive layer and the silicon layer may form silicide. Also, the conductive layer may include a silicon layer containing phosphorus or boron.

The silicon layer may include whisker-like crystalline silicon.

According to one embodiment of the present invention, a power storage device with improved cycle characteristics can be manufactured.

DETAILED DESCRIPTION OF THE INVENTION

Figure 1A:
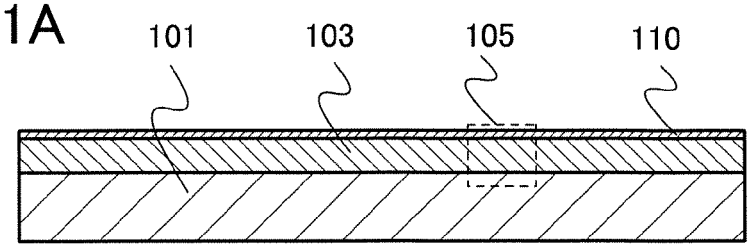
FIGS. 1A to 1D are cross-sectional views illustrating a method for manufacturing a negative electrode of a power storage device.

Hereinafter, examples of embodiments of the present invention will be described with reference to the drawings. Note that the present invention is not limited to the following description and it will be readily appreciated by those skilled in the art that modes and details can be modified in various ways without departing from the spirit and the scope of the present invention. Thus, the present invention should not be interpreted as being limited to the following description of the embodiments. In description with reference to the drawings, in some cases, the same reference numerals are used in common for the same portions in different drawings. Further, in some cases, the same hatching patterns are applied to similar parts, and the similar parts are not necessarily designated by reference numerals.

Embodiment 1

In this embodiment, an electrode of a power storage device which is one embodiment of the present invention and a method for manufacturing the electrode will be described with reference to FIGS. 1A to 1D and FIG. 2.

First, a silicon layer is formed as an active material layer 103 over a current collector 101 by an evaporation method, a sputtering method, a plasma CVD method, or a thermal CVD method, preferably a low-pressure chemical vapor deposition method (an LPCVD method) (see FIG. 1A).

The current collector 101 functions as a current collector of the electrode. Thus, a conductive material having a foil shape, a plate shape, or a net shape is used. For example, the current collector 101 can be formed using a metal element with high conductivity typified by platinum, aluminum, copper, titanium, or the like. The current collector 101 may be formed using an aluminum alloy to which an element which improves heat resistance, such as silicon, titanium, neodymium, scandium, or molybdenum, is added. Alternatively, a silicon wafer may be used as the current collector 101. Alternatively, the current collector 101 may be formed using a metal element which forms silicide. Examples of the metal element which forms silicide include zirconium, titanium, hafnium, vanadium, niobium, tantalum, chromium, molybdenum, tungsten, cobalt, and nickel. The current collector 101 can be formed by a sputtering method or a CVD method.

The active material layer 103 is a silicon layer. The silicon layer can be formed by a plasma CVD method or a thermal CVD method, preferably an LPCVD method. In this case, the silicon layer is formed using a deposition gas containing silicon as a source gas. Examples of the deposition gas containing silicon include silicon hydride, silicon fluoride, and silicon chloride, typically $SiH_4$, $Si_2H_6$, $SiF_4$, $SiCl_4$, and $Si_2Cl_6$. Note that hydrogen or a rare gas such as helium, neon, argon, or xenon may be mixed in the source gas. Note that the active material layer 103 may be formed by an evaporation method or a sputtering method.

Further, an impurity element imparting one conductivity type, such as phosphorus or boron, may be added to the silicon layer for forming the active material layer 103. The silicon layer to which the impurity element imparting one conductivity type, such as phosphorus or boron, is added has higher conductivity, so that the conductivity of the electrode can be increased. Therefore, the discharge capacity can be further increased. In the case where the active material layer 103 is formed by a plasma CVD method, a thermal CVD method, or an LPCVD method, film formation may be performed under an atmosphere containing an impurity element imparting one conductivity type, such as phosphorus or boron. For example, in order to make phosphorus be contained in the silicon layer, phosphine may be contained in a source gas, for example. In the case where the active material layer 103 is formed by an evaporation method or a sputtering method, the silicon layer may be doped with an impurity element imparting one conductivity type, such as phosphorus or boron.

Note that there is no particular limitation on crystallinity of the silicon layer which is formed as the active material layer 103. The silicon layer may be amorphous or crystalline. As the silicon layer which is formed as the active material layer 103, an amorphous silicon layer, a microcrystalline silicon layer, or a polycrystalline silicon layer can be used, for example. Here, a crystallization step may be performed on the silicon layer. In the case where a crystallization step is performed on the silicon layer, after the hydrogen concentration in the silicon layer is sufficiently reduced, the silicon layer may be subjected to heat treatment at a temperature at which heat treatment can be performed, or the silicon layer may be irradiated with laser light to be crystallized.

When the silicon layer is formed as the active material layer 103 by an LPCVD method, a silicon low-density region is not formed between the current collector 101 and the active material layer 103, electrons transfer easily at the interface between the current collector 101 and the active material layer 103, and the adhesion between the current collector 101 and the active material layer 103 can be increased. One of the reasons is that active species of the source gas are continuously supplied to the silicon layer that is being deposited in a step of forming the silicon layer, so that silicon diffuses into the current collector 101 from the silicon layer. Even if a region lacking silicon is formed, the active species of the source gas are continuously supplied to the region; therefore, the low-density region is unlikely to be formed in the silicon layer. In addition, since the silicon layer is formed over the current collector 101 by vapor-phase growth, the productivity of the power storage device can be improved.

Note that oxygen or the like which is released from a chamber of an LPCVD apparatus is contained as an impurity in the active material layer 103 in some cases.

Further, when the silicon layer is formed as the active material layer 103, an oxide film, such as a natural oxide film, having low conductivity is formed on the surface of the silicon layer. Therefore, the function of the electrode might decrease because the oxide film, such as a natural oxide film, having low conductivity which is formed on the surface of the silicon layer is overloaded at the time of charge and discharge. Accordingly, improvement in cycle characteristics of a power storage device has been hindered.

Then, the oxide film, such as a natural oxide film, which is formed on the surface of the active material layer 103 is removed, and a conductive layer 110 is formed by a CVD method or a sputtering method on and in contact with the active material layer 103 from the surface of which the oxide film, such as a natural oxide film, is removed (see FIG. 1A). Here, the thickness of the conductive layer 110 is preferably set to be greater than or equal to 0.1 nm and less than or equal to 10 nm.

Here, the oxide film, such as a natural oxide film, which is formed on the surface of the active material layer 103 including silicon can be removed by wet etching treatment using, as an etchant, a solution including hydrofluoric acid or an aqueous solution including hydrofluoric acid. As the etching treatment for removing the oxide film such as a natural oxide film, at least the oxide film such as a natural oxide film needs to be removed, and dry etching treatment can also be used. Alternatively, wet etching treatment and dry etching treatment may be used in combination. For the dry etching treatment, a parallel plate reactive ion etching (RIE) method, an inductively coupled plasma (ICP) etching method, or the like can be used.

A film having conductivity higher than that of the oxide film such as a natural oxide film is used for the conductive layer 110. Accordingly, the conductivity of the electrode surface of the power storage device is improved as compared to the case where the surface of the active material layer 103 is covered with an oxide film such as a natural oxide film. Thus, a risk of a decrease in the function of the electrode because of the overloading at the time of charge and discharge is reduced; therefore, cycle characteristics of the power storage device can be improved.

Here, the conductive layer 110 can be formed by a CVD method or a sputtering method, using a metal element with high conductivity typified by copper, nickel, titanium, manganese, cobalt, iron, or the like; preferably copper or nickel in particular. The conductive layer 110 contains at least one of the above metal elements, and may be formed as a metal layer or a compound layer, or silicide with silicon of the active material layer 103 may be formed. For example, a compound such as iron phosphate may be used for the conductive layer 110. Since the conductivity of the oxide of the above metal element is higher than the conductivity of the natural oxide film of silicon, even in the case where the above metal element is oxidized, conductivity in vicinity of the electrode surface of the power storage device can be made higher than the conductivity in the case where the surface of the active material layer 103 is covered with the oxide film such as a natural oxide film.

Note that in the case where whisker-like crystalline silicon, which will be described later, is used for the active material layer 103, it is preferable to employ a metal organic chemical vapor deposition (MOCVD) method to form a film of the above metal element which is used for the conductive layer 110.

Further, it is preferable to use an element having low reactivity to lithium, such as copper or nickel, for the conductive layer 110. Silicon included in the active material layer 103 expands when lithium ions are absorbed and shrinks when lithium ions are released. Therefore, in some cases, the active material layer 103 is destroyed when charge and discharge are repeated. However, when the active material layer 103 is covered with the conductive layer 110 including copper or nickel, the active material layer 103 can be prevented from being destroyed even charge and discharge are repeated because silicon, which is separated due to the change in volume as a result of absorbing and discharging of lithium ions, can be kept in the active material layer 103. Accordingly, cycle characteristics of the power storage device can be improved.

Further, even when the oxide film, such as a natural oxide film, which is formed on the surface of the active material layer 103 is not removed, a metal element with a high reducing property, such as titanium, which is contained in the conductive layer 110 can reduce the oxide film.

The conductive layer 110 may be a silicon layer to which an impurity element imparting one conductivity type, such as phosphorus or boron, is added. In this case, the conductive layer 110 may be formed under an atmosphere containing an impurity element imparting one conductivity type, such as phosphorus or boron, by a plasma CVD method, a thermal CVD method, or an LPCVD method. Even in the case where the silicon layer to which an impurity element imparting one conductivity type, such as phosphorus or boron, is added is oxidized, the silicon layer can make higher the conductivity in vicinity of the electrode surface of the power storage device than the conductivity in the case where the surface of the active material layer 103 is covered with the oxide film such as a natural oxide film. Note that in the case where whisker-like crystalline silicon, which will be described later, is used for the active material layer 103, it is preferable to employ an LPCVD method to form a film of the silicon layer which is used for the conductive layer 110.

Note that there is no particular limitation on crystallinity of the silicon layer which is formed as the conductive layer 110. The silicon layer may be amorphous or crystalline. As the silicon layer which is formed as the conductive layer 110, an amorphous silicon layer, a microcrystalline silicon layer, or a polycrystalline silicon layer can be used, for example. Here, a crystallization step may be performed on the silicon layer. In the case where a crystallization step is performed on the silicon layer, after the hydrogen concentration in the silicon layer is sufficiently reduced, the silicon layer may be subjected to heat treatment at a temperature at which heat treatment can be performed, or the silicon layer may be irradiated with laser light to be crystallized.

In such a manner, the conductivity of the electrode surface of the power storage device is improved by providing the conductive layer 110 in contact with the surface of the active material layer 103 after the removal of the oxide film, such as a natural oxide film, which is formed on the surface of the active material layer 103. Thus, a risk of a decrease in the function of the electrode because of the overloading at the time of charge and discharge is reduced; therefore, cycle characteristics of the power storage device can be improved.

Figure 1B:
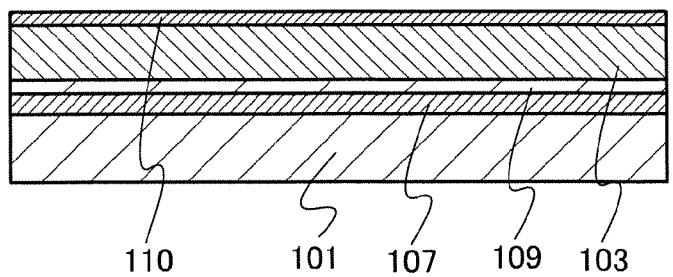

Here, an enlarged view of the current collector 101 and the active material layer 103, which is surrounded by a dashed line 105, is illustrated in FIG. 1B.

As illustrated in FIG. 1B, a mixed layer 107 is formed between the current collector 101 and the active material layer 103 in some cases. In this case, the mixed layer 107 is formed with a metal element contained in the current collector 101 and silicon. Note that silicon is diffused into the current collector 101 by heating during the formation of the silicon layer as the active material layer 103, whereby the mixed layer 107 is formed.

In the case where the current collector 101 is formed using a metal element which forms silicide, the mixed layer 107 is formed using silicide, typically one or more of zirconium silicide, titanium silicide, hafnium silicide, vanadium silicide, niobium silicide, tantalum silicide, chromium silicide, molybdenum silicide, tungsten silicide, cobalt silicide, and nickel silicide. Alternatively, an alloy layer of silicon and a metal element is formed.

Note that oxygen or the like which is released from a chamber of an LPCVD apparatus is contained as an impurity in the mixed layer 107 in some cases.

With the mixed layer 107 between the current collector 101 and the active material layer 103, resistance at the interface between the current collector 101 and the active material layer 103 can be reduced; thus, the conductivity of the electrode can be increased. Therefore, the discharge capacity can be further increased. In addition, the adhesion between the current collector 101 and the active material layer 103 can be increased, so that deterioration of the power storage device can be suppressed and cycle characteristics of the power storage device can be improved.

Over the mixed layer 107, a metal oxide layer 109 which includes an oxide of the metal element included in the current collector 101 may be formed in some cases. Note that when the crystalline silicon layer is formed by an LPCVD method, by filling the chamber with a rare gas such as helium, neon, argon, or xenon, formation of the metal oxide layer 109 can also be suppressed.

In the case where the current collector 101 is formed using a metal element which forms silicide, typical examples of the metal oxide layer 109 to be formed include zirconium oxide, titanium oxide, hafnium oxide, vanadium oxide, niobium oxide, tantalum oxide, chromium oxide, molybdenum oxide, tungsten oxide, cobalt oxide, and nickel oxide. Note that when the current collector 101 is a layer containing a metal element such as titanium, zirconium, niobium, or tungsten, the metal oxide layer 109 contains an oxide conductor such as titanium oxide, zirconium oxide, niobium oxide, or tungsten oxide; thus, resistance between the current collector 101 and the active material layer 103 can be reduced and the conductivity of the electrode can be increased. Therefore, the discharge capacity can be further increased.

Figure 1C:
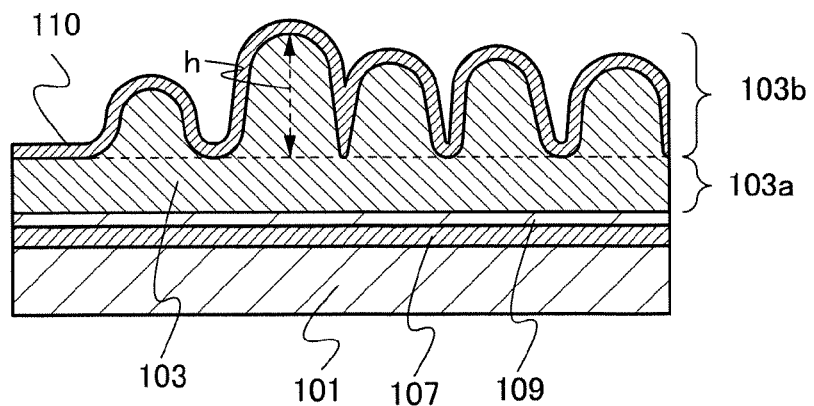

In addition, when the active material layer 103 is formed by an LPCVD method, the active material layer 103 can include a crystalline silicon region 103a and a crystalline silicon region 103b including a whisker formed over the crystalline silicon region 103a (see FIG. 1C). The active material layer 103 including the crystalline silicon region 103a and the crystalline silicon region 103b including a whisker over the crystalline silicon region 103a can be formed using a deposition gas containing silicon as a source gas while heating is performed at a temperature higher than 550° C. and lower than or equal to the upper-limit temperature which an LPCVD apparatus and the current collector 101 can withstand, preferably a temperature higher than or equal to 580° C. and lower than 650° C.

Note that the boundary between the crystalline silicon region 103a and the crystalline silicon region 103b including a whisker is not clear. Here, a plane that includes valleys formed between whiskers in the crystalline silicon region 103b including a whisker is regarded as a tentative boundary between the crystalline silicon region 103a and the crystalline silicon region 103b including a whisker.

The crystalline silicon region 103a is provided so as to cover the current collector 101. The whisker in the crystalline silicon region 103b may have a columnar shape such as a cylinder shape or a prism shape, or a cone shape or a needle shape such as a circular cone shape or a pyramid shape as long as the whisker is a crystalline protrusion. The top of the whisker may be rounded. The diameter of the whisker is greater than or equal to 50 nm and less than or equal to 10 μm, preferably greater than or equal to 500 nm and less than or equal to 3 μm. In addition, the length of the whisker is longer than or equal to 0.5 μm and shorter than or equal to 1000 μm preferably longer than or equal to 1.0 μm and shorter than or equal to 100 μm.

A length h of the whisker refers here to a growth direction (a long-side direction) of the whisker. For example, in the case where the whisker has a columnar shape, the length h of the whisker corresponds to the distance between the top surface and the bottom surface of the whisker; and in the case where the whisker has a cone shape, the length h of the whisker corresponds to the distance between the apex and the bottom surface of the whisker. In addition, the thickness of the crystalline silicon layer refers to the sum of the thickness of the crystalline silicon region 103a and the thickness of the crystalline silicon region 103b including a whisker, and the thickness of the crystalline silicon region 103b including a whisker refers to the distance from the maximum height point of the whiskers to the boundary between the crystalline silicon region 103a and the crystalline silicon region 103b including a whisker.

Note that the growth direction of the whisker (the direction in which the whisker extends from the crystalline silicon region 103a) is referred to as a long-side direction. A cross-sectional shape along the long-side direction is referred to as a long-side cross-sectional shape in some cases. In addition, the shape of a cross section in which the long-side direction is a normal direction is referred to as a transverse cross-sectional shape in some cases.

As illustrated in FIG. 1C, the long-side directions of the whiskers may be extended in one direction, for example, the normal direction to the surface of the crystalline silicon region 103a. Note that in this case, the long-side directions of the whiskers may be substantially the same as the normal direction to the surface of the crystalline silicon region 103a. That is, the long-side cross-sectional shapes of whiskers are mainly illustrated in FIG. 1C.

Figure 1D:
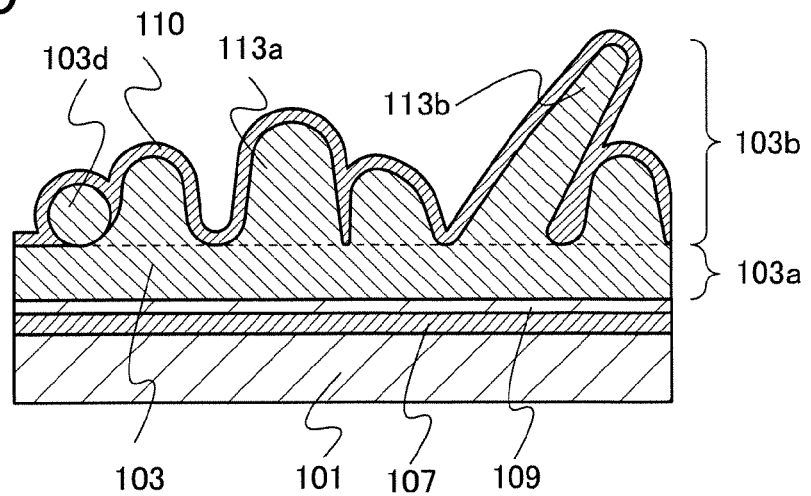

Alternatively, as illustrated in FIG. 1D, the long-side directions of the whisker may be extended randomly. Typically, the crystalline silicon region 103b including a whisker may include a first whisker 113a whose long-side direction is substantially the same as the normal direction to the surface of the crystalline silicon region 103a and a second whisker 113b whose long-side direction is different from the normal direction to the surface of the crystalline silicon region 103a. Further, the length h of the second whisker 113b may be longer than that of the first whisker 113a. That is, FIG. 1D illustrates a whisker having a transverse cross-sectional shape like a region 103d, in addition to the whiskers having long-side cross-sectional shapes. The region 103d is circular because it is a transverse cross-sectional shape of a whisker having a cylinder or circular cone shape. However, when the whisker has a prism or pyramid shape, the region 103d is polygonal. When the long-side directions of the whiskers are extended randomly, the whiskers are tangled with each other in some cases; therefore, the whiskers are unlikely to be peeled in charge and discharge of the power storage device.

Experimental Example

The advantageous effect in the case where a crystalline silicon layer including a whisker is used for part of an electrode of a power storage device was confirmed. Specifically, two power storage devices were prepared and the characteristics were compared. One was a power storage device (Experimental Example) in which a crystalline silicon layer including a whisker was used as an active material layer of a negative electrode. The other was a power storage device (Comparative Example) in which a planarized crystalline silicon layer was used as an active material layer of a negative electrode.

Note that the structure of the power storage device of Experimental Example and the structure of the power storage device of Comparative Example were the same except for the active material layer of the negative electrode. That is, results shown in Experimental Example are due to the difference between the active material layers of the negative electrode.

The active material layer of the negative electrode in the power storage device of Experimental Example contained a plurality of whiskers. Therefore, the surface area of the active material layer is larger than the surface area of the planarized active material layer. The length of the whiskers was approximately 15 μm to 20 μm at most. The diameter of the whisker near the root was approximately 1 μm to 2 μm. Note that the directions of the whiskers were extended randomly.

In the power storage device of Comparative Example, a planarized crystalline silicon layer was used as the active material layer of the negative electrode. The crystalline silicon layer was obtained by performing heat treatment on an amorphous silicon layer to which phosphorus was added and which was formed by a plasma CVD method. Note that the heat treatment was performed at 700° C. under an Ar atmosphere for 6 hours.

The discharge capacity of the above two kinds of power storage devices which were different in the active material layer of the negative electrode was measured using a charge-discharge measuring device. The measurement was performed by a constant current mode in which a current of 2.0 mA was charged and discharged at a rate of approximately 0.2 C. The upper limit voltage was 1.0 V, and the lower limit voltage was 0.03 V. Note that all of the measurements were performed at room temperature (approximately 25° C.).

As the initial characteristics (the initial characteristics of the discharge capacity (mAh/cm$^3$) per unit volume of the respective active material layers) of the power storage devices thus obtained, 7300 mAh/cm$^3$ was obtained in the power storage device of Experimental Example and 4050 mAh/cm$^3$ was obtained in the power storage device of Comparative Example. It is found that the discharge capacity of the power storage device of Experimental Example is approximately 1.8 times as large as that of the power storage device of Comparative Example. Here, the discharge capacity (mAh/cm$^3$) was calculated on the assumption that the thickness of the active material layer of the power storage device of Experimental Example was 3.5 μm and the thickness of the active material layer of the power storage device of Comparative Example was 3.0 μm.

In such a manner, the value of the actual capacity of the power storage device of Experimental Example is close to that of the theoretical capacity (9800 mAh/cm$^3$), and it is understood that the use of the crystalline silicon layer including a whisker for part of an electrode of a power storage device is extremely effective.

The electrode of the power storage device in FIG. 1C or 1D includes a whisker-like crystalline silicon layer as the active material layer. When a whisker is thus included in the active material layer, the surface area of the active material layer increases; therefore, discharge capacity of the power storage device can be increased.

As the electrode of the power storage device described in this embodiment, the conductive layer 110 is provided in contact with the surface of the active material layer 103 after the removal of the oxide film, such as a natural oxide film, which is formed on the surface of the active material layer 103. Accordingly, the conductivity of the electrode surface of the power storage device is improved, whereby cycle characteristics of the power storage device can be improved.

The electrode of the power storage device described in this embodiment includes at least the mixed layer 107 between the current collector 101 and the active material layer 103 (silicon layer). Therefore, resistance due to the interface between the current collector 101 and the active material layer 103 can be reduced, and adhesion between the current collector 101 and the active material layer 103 can be increased; therefore, the discharge capacity can be increased and deterioration of the power storage device can be suppressed.

Figure 2:
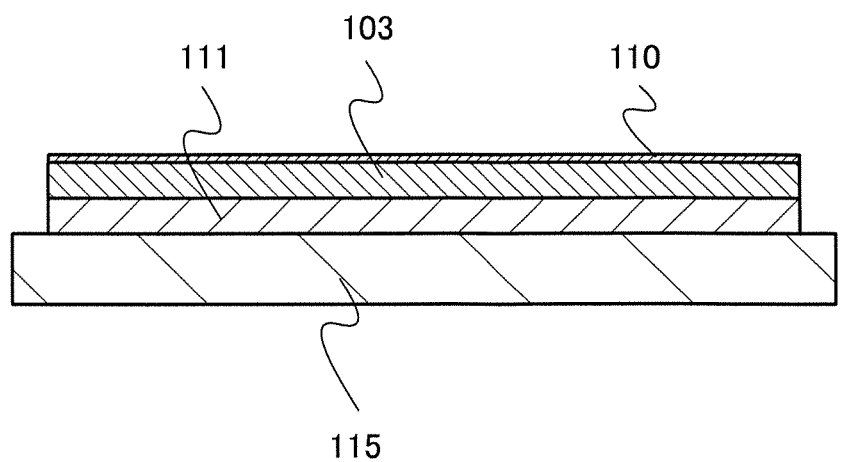
FIG. 2 is a cross-sectional view illustrating a method for manufacturing a negative electrode of a power storage device.

Note that FIGS. 1A to 1D illustrate the case where the current collector 101 is formed using a conductive material having a foil shape, a plate shape, or a net shape; however, as illustrated in FIG. 2, a current collector 111 can be formed by a sputtering method, an evaporation method, a printing method, an ink-jet method, a CVD method, or the like as appropriate over a substrate 115.

Through the above process, the electrode of the power storage device having a large discharge capacity can be manufactured.

This embodiment can be implemented in combination with any of the other embodiments.

Embodiment 2

In this embodiment, a structure of a power storage device will be described with reference to FIGS. 3A and 3B.

First, a structure of a secondary battery which is an example of a power storage device will be described. Among secondary batteries, a lithium ion battery formed using a metal oxide containing lithium, such as $LiCoO_2$, has a large discharge capacity and high safety. Thus, a structure of a lithium ion battery, which is a typical example of the secondary battery, will be described.

Figure 3A:
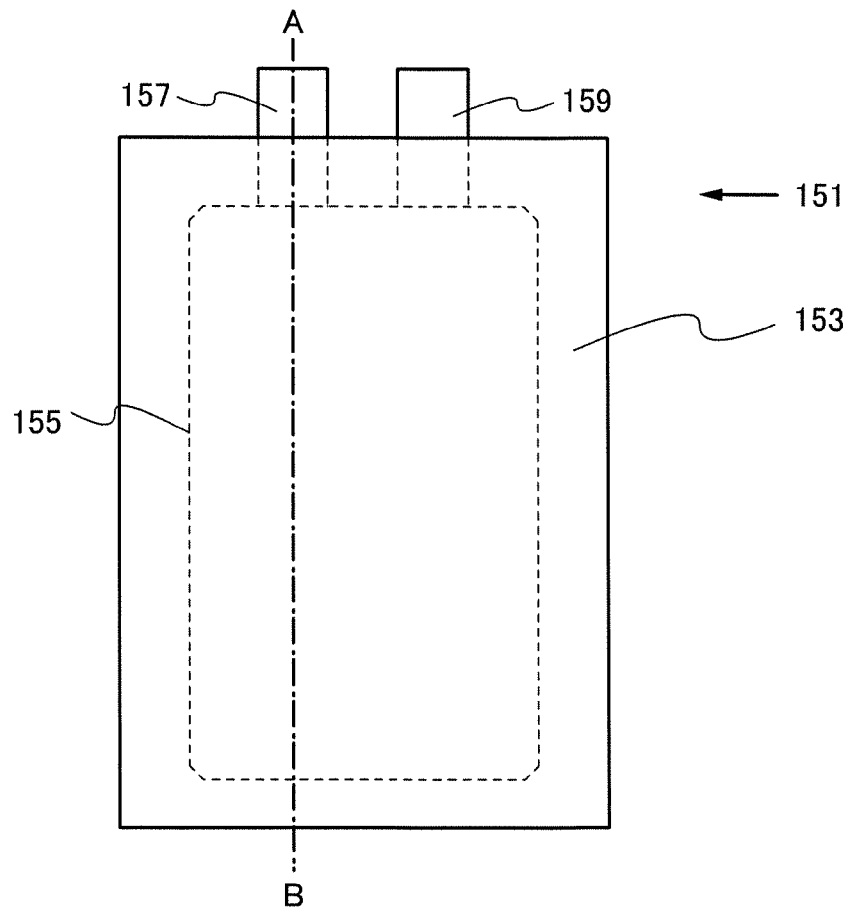
FIGS. 3A and 3B are a plan view and a cross-sectional view, respectively, illustrating one embodiment of a power storage device.
Figure 3B:
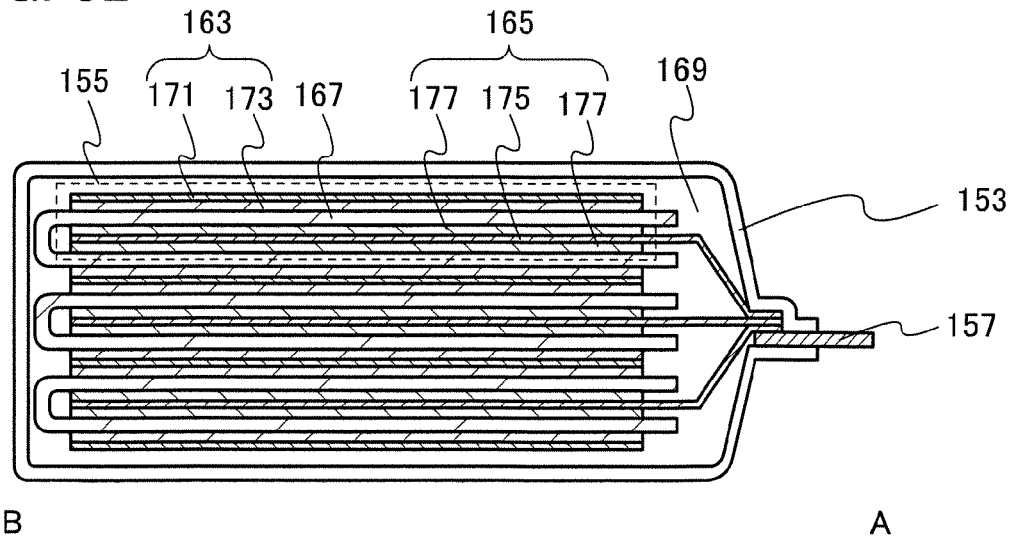

FIG. 3A is a plan view of a power storage device 151, and FIG. 3B is a cross-sectional view taken along dot-dashed line A-B in FIG. 3A.

The power storage device 151 in FIG. 3A includes a power storage cell 155 in an exterior member 153. The power storage device 151 further includes a terminal portion 157 and a terminal portion 159 which are connected to the power storage cell 155. For the exterior member 153, a laminate film, a polymer film, a metal film, a metal case, a plastic case, or the like can be used.

As illustrated in FIG. 3B, the power storage cell 155 includes a negative electrode 163, a positive electrode 165, a separator 167 provided between the negative electrode 163 and the positive electrode 165, and an electrolyte 169 with which the exterior member 153 is filled.

The negative electrode 163 includes a negative electrode current collector 171 and a negative electrode active material layer 173. The positive electrode 165 includes a positive electrode current collector 175 and a positive electrode active material layer 177. The negative electrode active material layer 173 is formed on one or both of the surfaces of the negative electrode current collector 171. The positive electrode active material layer 177 is formed on one or both of the surfaces of the positive electrode current collector 175.

The negative electrode current collector 171 is connected to the terminal portion 157. The positive electrode current collector 175 is connected to the terminal portion 159. Further, the terminal portion 157 and the terminal portion 159 each partly extend outside the exterior member 153.

Note that although a sealed thin power storage device is described as the power storage device 151 in this embodiment, a power storage device can have a variety of structures; for example, a button power storage device, a cylindrical power storage device, or a rectangular power storage device can be used. Further, although the structure where the positive electrode, the negative electrode, and the separator are stacked is described in this embodiment, a structure where the positive electrode, the negative electrode, and the separator are rolled may be employed.

The negative electrode current collector 171 can be formed using the current collector 101 or the current collector 111 described in Embodiment 1.

The negative electrode active material layer 173 can be formed using the active material layer 103 which is formed using the silicon layer described in Embodiment 1. Note that the silicon layer may be pre-doped with lithium.

Aluminum, stainless steel, or the like is used for the positive electrode current collector 175. The positive electrode current collector 175 can have a foil shape, a plate shape, a net shape, or the like as appropriate.

The positive electrode active material layer 177 can be formed using $LiFeO_2$, $LiCoO_2$, $LiNiO_2$, $LiMn_2O_4$, $LiFePO_4$, $LiCoPO_4$, $LiNiPO_4$, $LiMn_2PO_4$, $V_2O_5$, $Cr_2O_5$, $MnO_2$, or other lithium compounds as a material. Note that when carrier ions are alkaline earth metal ions or alkali metal ions other than lithium ions, the positive electrode active material layer 177 can be formed using, instead of lithium in the above lithium compounds, an alkali metal (e.g., sodium or potassium) or an alkaline earth metal (e.g., beryllium, magnesium, calcium, strontium, or barium).

As a solute of the electrolyte 169, a material in which lithium ions, i.e., carrier ions, can transfer and stably exist is used. Typical examples of the solute of the electrolyte include lithium salt such as $LiClO_4$, $LiAsF_6$, $LiBF_4$, $LiPF_6$, and $Li(C_2F_5SO_2)_2N$. Note that when carrier ions are alkaline earth metal ions or alkali metal ions other than lithium ions, the solute of the electrolyte 169 can be formed using alkali metal salt such as sodium salt or potassium salt; alkaline earth metal salt such as beryllium salt, magnesium salt, calcium salt, strontium salt, or barium salt; or the like, as appropriate.

As the solvent of the electrolyte 169, a material which can transfer lithium ions, i.e., carrier ions, is used. As the solvent of the electrolyte 169, an aprotic organic solvent is preferably used. Typical examples of an aprotic organic solvent include ethylene carbonate, propylene carbonate, dimethyl carbonate, diethyl carbonate, γ-butyrolactone, acetonitrile, dimethoxyethane, and tetrahydrofuran, and one or more of these materials can be used. When a gelled polymer is used as the solvent of the electrolyte 169, safety of the power storage device 151 against liquid leakage or the like is increased. In addition, the power storage device 151 can be thin and lightweight. Typical examples of gelled polymers include a silicon gel, an acrylic gel, an acrylonitrile gel, polyethylene oxide, polypropylene oxide, and a fluorine-based polymer.

As the electrolyte 169, a solid electrolyte such as $Li_3PO_4$ can be used.

An insulating porous material is used for the separator 167. Typical examples of the separator 167 include cellulose (paper), polyethylene, and polypropylene.

A lithium ion battery has a small memory effect, a high energy density, and a large discharge capacity. In addition, the driving voltage of the lithium ion battery is high. Thus, the size and weight of the lithium ion battery can be reduced. Further, the lithium ion battery does not easily degrade due to repetitive charge and discharge and can be used for a long time, so that cost can be reduced.

Next, a structure of a capacitor which is another example of a power storage device will be described. Typical examples of a capacitor include a double-layer capacitor and a lithium ion capacitor.

In the case of a capacitor, instead of the positive electrode active material layer 177 in the secondary battery in FIG. 3B, a material capable of reversibly occlude lithium ions and/or anions is preferably used. Typical examples of the positive electrode active material layer 177 include active carbon, a conductive polymer, and a polyacene organic semiconductor (PAS).

The lithium ion capacitor has high efficiency of charge and discharge, capability of rapidly performing charge and discharge, and a long life even when it is repeatedly used.

A power storage device with improved cycle characteristics can be manufactured by using the electrode including the current collector, the active material layer, and the conductive layer, which is described in Embodiment 1, as a negative electrode in these capacitors.

Note that a power storage device using the electrode which is one embodiment of the present invention is not limited to the above. For example, the electrode including the current collector and the active material layer, which is described in Embodiment 1, can also be used as a negative electrode of an air cell which is another embodiment of the present invention. A power storage device with improved cycle characteristics can be manufactured also in this case.

This embodiment can be implemented in combination with any of the other embodiments.

Embodiment 3

In this embodiment, an application example of the power storage device described in Embodiment 2 will be described with reference to FIG. 4.

The power storage device described in Embodiment 2 can be used in electronic devices, for example, cameras such as digital cameras or video cameras, digital photo frames, mobile phones (also referred to as cellular phones or cellular phone devices), portable game machines, portable information terminals, or audio reproducing devices. Further, the power storage device can be used in electric propulsion vehicles such as electric vehicles, hybrid vehicles, electric railway vehicles, maintenance vehicles, carts, or wheelchairs. Here, as a typical example of the electric propulsion vehicles, a wheelchair is described.

Figure 4:
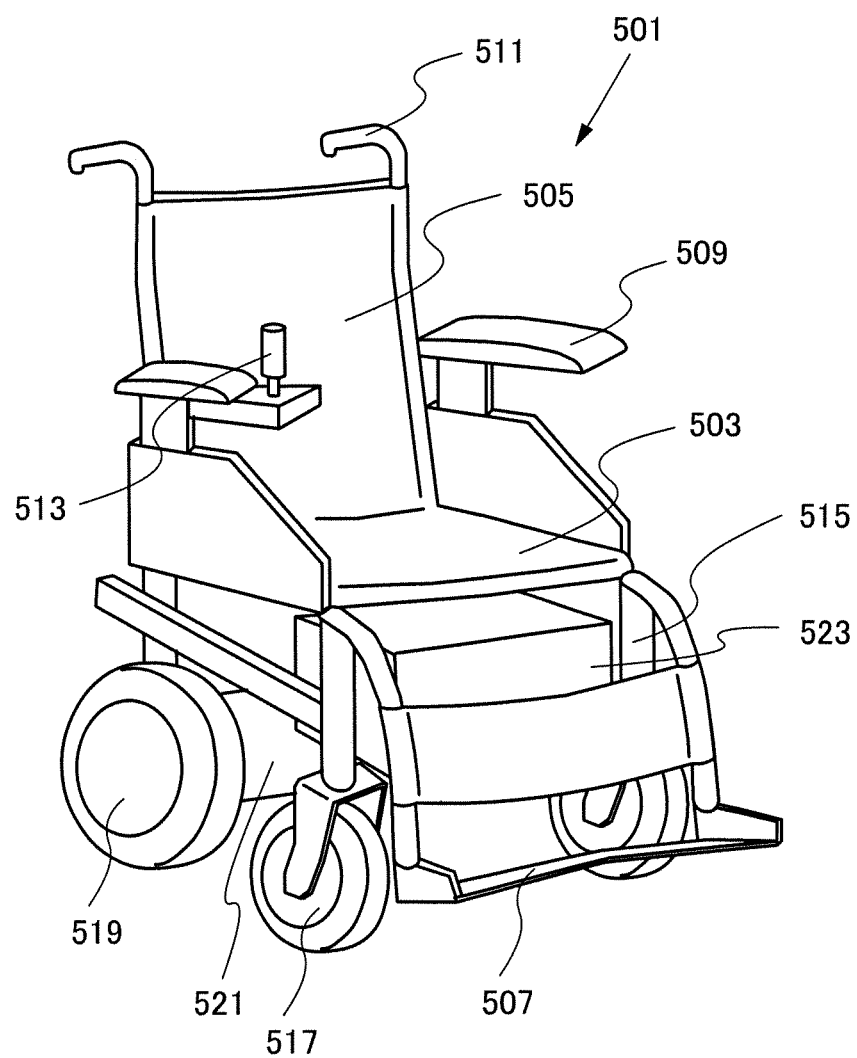
FIG. 4 is a perspective view illustrating an application example of a power storage device.

FIG. 4 is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair is provided for one of the armrests 509. A pair of front wheels 517 is provided at the front of and below the seat 503 through a frame 515 provided below the seat 503, and a pair of rear wheels 519 is provided behind and below the seat 503. The rear wheels 519 are connected to a driving portion 521 having a motor, a brake, a gear, and the like. A control portion 523 including a battery, a power controller, a control means, and the like is provided under the seat 503. The control portion 523 is connected to the controller 513 and the driving portion 521. The driving portion 521 drives through the control portion 523 with the operation of the controller 513 by the user and the driving portion 521 controls the operation of moving forward, moving backward, turning around, and the like, and the speed of the electric wheelchair 501.

The power storage device described in Embodiment 2 can be used as the power source of the control portion 523. The power source of the control portion 523 can be externally charged by electric power supply using plug-in systems or contactless power feeding. Note that in the case where the electric propulsion vehicle is an electric railway vehicle, the electric railway vehicle can be charged by electric power supply from an overhead cable or a conductor rail.

This embodiment can be implemented in combination with any of the other embodiments.

Embodiment 4

In this embodiment, an example in which the secondary battery according to one embodiment of the present invention is used in a wireless power feeding system (hereinafter referred to as an RF power feeding system) will be described with reference to block diagrams in FIG. 5 and FIG. 6. In each of the block diagrams, independent blocks show elements within a power receiving device and a power feeding device, which are classified according to their functions. However, it may be practically difficult to completely separate the elements according to their functions and one element can involve a plurality of functions in some cases.

First, the RF power feeding system is described with reference to FIG. 5.

A power receiving device 600 is included in an electronic device, an electric propulsion vehicle, or the like which is driven by electric power supplied from a power feeding device 700, and can be applied to another device which is driven by electric power, as appropriate. Typical examples of the electronic device include cameras such as digital cameras or video cameras, digital photo frames, mobile phones (also referred to as cellular phones or cellular phone devices), portable game machines, portable information terminals, audio reproducing devices, display devices, and computers. Typical examples of the electric propulsion vehicles include electric vehicles, hybrid vehicles, electric railway vehicles, maintenance vehicles, carts, and wheelchairs. In addition, the power feeding device 700 has a function of supplying electric power to the power receiving device 600.

Figure 5:
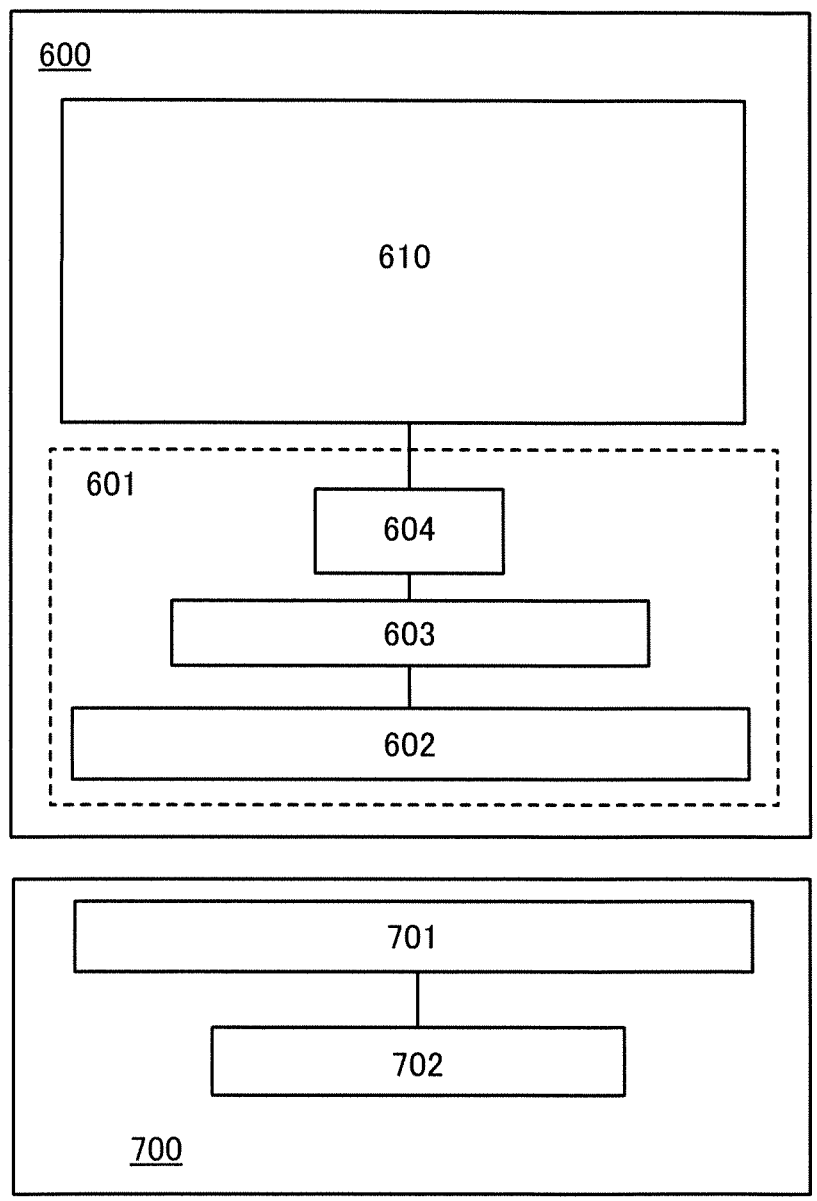
FIG. 5 is a diagram illustrating a configuration of a wireless power feeding system.

In FIG. 5, the power receiving device 600 includes a power receiving device portion 601 and a power load portion 610. The power receiving device portion 601 includes at least a power receiving device antenna circuit 602, a signal processing circuit 603, and a secondary battery 604. The power feeding device 700 includes at least a power feeding device antenna circuit 701 and a signal processing circuit 702.

The power receiving device antenna circuit 602 has a function of receiving a signal transmitted by the power feeding device antenna circuit 701 or transmitting a signal to the power feeding device antenna circuit 701. The signal processing circuit 603 processes a signal received by the power receiving device antenna circuit 602 and controls charging of the secondary battery 604 and supplying of electric power from the secondary battery 604 to the power load portion 610. In addition, the signal processing circuit 603 controls operation of the power receiving device antenna circuit 602. That is, the signal processing circuit 603 can control the intensity, the frequency, or the like of a signal transmitted by the power receiving device antenna circuit 602. The power load portion 610 is a driving portion which receives electric power from the secondary battery 604 and drives the power receiving device 600. Typical examples of the power load portion 610 include a motor and a driving circuit. Another device which drives the power receiving device by receiving electric power can be used as the power load portion 610 as appropriate. The power feeding device antenna circuit 701 has a function of transmitting a signal to the power receiving device antenna circuit 602 or receiving a signal from the power receiving device antenna circuit 602. The signal processing circuit 702 processes a signal received by the power feeding device antenna circuit 701. In addition, the signal processing circuit 702 controls operation of the power feeding device antenna circuit 701. That is, the signal processing circuit 702 can control the intensity, the frequency, or the like of a signal transmitted by the power feeding device antenna circuit 701.

The secondary battery according to one embodiment of the present invention is used as the secondary battery 604 included in the power receiving device 600 in the RF power feeding system in FIG. 5.

With the use of the secondary battery according to one embodiment of the present invention in the RF power feeding system, the amount of power storage can be made larger than that in a conventional secondary battery. Therefore, the time interval of the wireless power feeding can be lengthened (frequent power feeding can be omitted).

In addition, with the use of the secondary battery according to one embodiment of the present invention in the RF power feeding system, the power receiving device 600 can be formed to be compact and lightweight if the amount of power storage with which the power load portion 610 can be driven is the same as that in a conventional secondary battery. Therefore, the total cost can be reduced.

Next, another example of the RF power feeding system is described with reference to FIG. 6.

Figure 6:
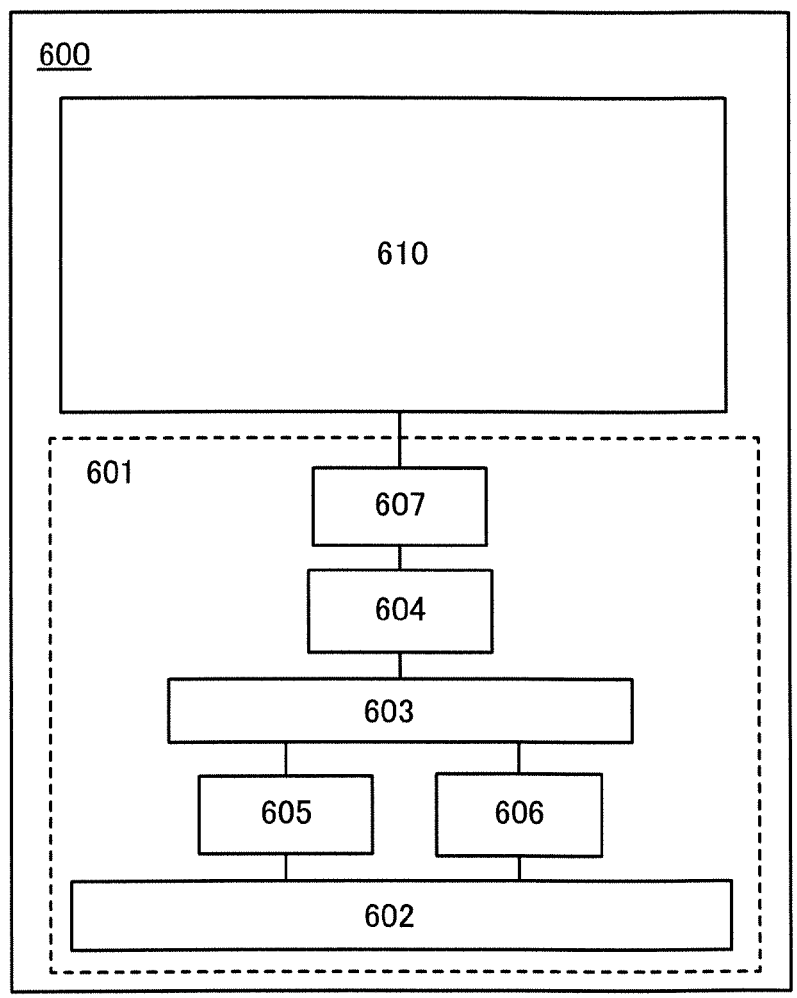
FIG. 6 is a diagram illustrating a configuration of a wireless power feeding system.
Figure 6:
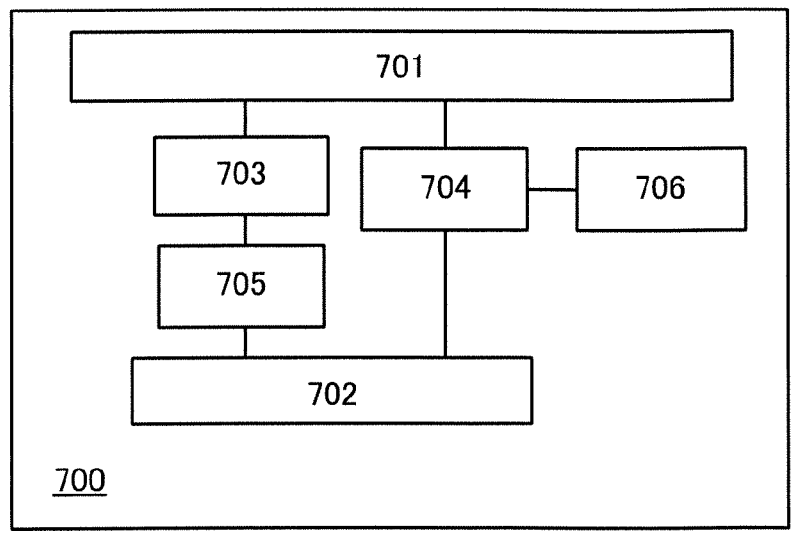

In FIG. 6, the power receiving device 600 includes the power receiving device portion 601 and the power load portion 610. The power receiving device portion 601 includes at least the power receiving device antenna circuit 602, the signal processing circuit 603, the secondary battery 604, a rectifier circuit 605, a modulation circuit 606, and a power supply circuit 607. In addition, the power feeding device 700 includes at least the power feeding device antenna circuit 701, the signal processing circuit 702, a rectifier circuit 703, a modulation circuit 704, a demodulation circuit 705, and an oscillator circuit 706.

The power receiving device antenna circuit 602 has a function of receiving a signal transmitted by the power feeding device antenna circuit 701 or transmitting a signal to the power feeding device antenna circuit 701. When the power receiving device antenna circuit 602 receives a signal transmitted by the power feeding device antenna circuit 701, the rectifier circuit 605 has a function of generating a DC voltage from the signal received by the power receiving device antenna circuit 602. The signal processing circuit 603 has a function of processing a signal received by the power receiving device antenna circuit 602 and controlling charging of the secondary battery 604 and supplying of electric power from the secondary battery 604 to the power supply circuit 607. The power supply circuit 607 has a function of converting voltages stored by the secondary battery 604 into voltages needed for the power load portion 610. The modulation circuit 606 is used when a certain response signal is transmitted from the power receiving device 600 to the power feeding device 700.

With the power supply circuit 607, electric power supplied to the power load portion 610 can be controlled. Thus, overvoltage application to the power load portion 610 can be suppressed, and deterioration or breakdown of the power receiving device 600 can be reduced.

In addition, with the modulation circuit 606, a signal can be transmitted from the power receiving device 600 to the power feeding device 700. Therefore, when the amount of charged power in the power receiving device 600 is judged and a certain amount of power is charged, a signal is transmitted from the power receiving device 600 to the power feeding device 700 so that power feeding from the power feeding device 700 to the power receiving device 600 can be stopped. As a result, the secondary battery 604 is not fully charged, so that the number of charge times of the secondary battery 604 can be increased.

The power feeding device antenna circuit 701 has a function of transmitting a signal to the power receiving device antenna circuit 602 or receiving a signal from the power receiving device antenna circuit 602. When a signal is transmitted to the power receiving device antenna circuit 602, the signal processing circuit 702 generates a signal which is transmitted to the power receiving device 600. The oscillator circuit 706 generates a signal with a constant frequency. The modulation circuit 704 has a function of applying a voltage to the power feeding device antenna circuit 701 in accordance with the signal generated by the signal processing circuit 702 and the signal with a constant frequency generated by the oscillator circuit 706. Thus, a signal is output from the power feeding device antenna circuit 701. On the other hand, when a signal is received from the power receiving device antenna circuit 602, the rectifier circuit 703 has a function of rectifying the received signal. From signals rectified by the rectifier circuit 703, the demodulation circuit 705 extracts a signal transmitted from the power receiving device 600 to the power feeding device 700. The signal processing circuit 702 has a function of analyzing the signal extracted by the demodulation circuit 705.

Note that any other circuits may be provided between circuits as long as the RF power feeding can be performed. For example, after the power receiving device 600 receives a signal and the rectifier circuit 605 generates a DC voltage, a circuit such as a DC-DC converter or a regulator that is provided in a subsequent stage may generate a constant voltage. Thus, overvoltage application to the inside of the power receiving device 600 can be suppressed.

A secondary battery according to one embodiment of the present invention is used as the secondary battery 604 included in the power receiving device 600 in the RF power feeding system in FIG. 6.

With the use of the secondary battery according to one embodiment of the present invention in the RF power feeding system, the amount of power storage can be made larger than that in a conventional secondary battery. Therefore, the time interval of the wireless power feeding can be lengthened (frequent power feeding can be omitted).

In addition, with the use of the secondary battery according to one embodiment of the present invention in the RF power feeding system, the power receiving device 600 can be formed to be compact and lightweight if the amount of power storage with which the power load portion 610 can be driven is the same as that in a conventional secondary battery. Therefore, the total cost can be reduced.

Note that when the secondary battery according to one embodiment of the present invention is used in the RF power feeding system and the power receiving device antenna circuit 602 and the secondary battery 604 are overlapped with each other, it is preferable that the impedance of the power receiving device antenna circuit 602 be not changed by deformation of the secondary battery 604 due to charge and discharge of the secondary battery 604 and deformation of an antenna due to the above deformation. This is because, when the impedance of the antenna is changed, in some cases, electric power is not supplied sufficiently. For example, the secondary battery 604 may be placed in a battery pack formed using metal or ceramics. Note that in that case, the power receiving device antenna circuit 602 and the battery pack are preferably separated from each other by several tens of micrometers or more.

In addition, the charging signal has no limitation on its frequency and may have any band of frequency as long as electric power can be transmitted. For example, the charging signal may have any of an LF band of 135 kHz (long wave), an HF band of 13.56 MHz, a UHF band of 900 MHz to 1 GHz, and a microwave band of 2.45 GHz.

A signal transmission method may be selected as appropriate from a variety of methods including an electromagnetic coupling method, an electromagnetic induction method, a resonance method, and a microwave method. In order to prevent energy loss due to foreign substances containing moisture, such as rain and mud, the electromagnetic induction method or the resonance method using a low frequency band, specifically, very-low frequencies of 3 kHz to 30 kHz, low frequencies of 30 kHz to 300 kHz, medium frequencies of 300 kHz to 3 MHz, or high frequencies of 3 MHz to 30 MHz is preferably used.

This embodiment can be implemented in combination with any of the other embodiments.

This application is based on Japanese Patent Application serial No. 2010-123388 filed with the Japan Patent Office on May 28, 2010, the entire contents of which are hereby incorporated by reference.

What is claimed is:

1. A power storage device comprising:
   a current collector;
   an active material layer over the current collector, the active material layer having:
      a first region comprising crystalline silicon; and
      a second region comprising crystalline silicon protrusions on the first region, wherein the crystalline silicon protrusions continuously extend from the first region; and
   a conductive layer which is on and in contact with a surface of the second region of the active material layer.

2. The power storage device according to claim 1, wherein the conductive layer comprises one or more of copper, nickel, titanium, manganese, cobalt, and iron.

3. The power storage device according to claim 1, further comprising silicide of the conductive layer in the conductive layer or between the conductive layer and the active material layer.

4. The power storage device according to claim 1, wherein the conductive layer comprises a second silicon layer containing phosphorus or boron.

5. The power storage device according to claim 1, wherein a longest length of the crystalline silicon protrusions is 15 µm to 20 µm.

6. A power storage device comprising:
   a current collector comprising a metal element;
   a mixed layer comprising the metal element and silicon on the current collector;
   an active material layer over the mixed layer, the active material layer having:
      a first region comprising crystalline silicon; and
      a second region comprising crystalline silicon protrusions on the first region, wherein the crystalline silicon protrusions continuously extend from the first region; and
   a conductive layer which is on and in contact with a surface of the second region of the active material layer.

7. The power storage device according to claim 6, wherein a thickness of the conductive layer is greater than or equal to 0.1 nm and less than or equal to 10 nm.

8. The power storage device according to claim 6, wherein the conductive layer comprises one or more of copper, nickel, titanium, manganese, cobalt, and iron.

9. The power storage device according to claim 6, further comprising silicide of the conductive layer in the conductive layer or between the conductive layer and the active material layer.

10. The power storage device according to claim 6, wherein the conductive layer comprises a second silicon layer containing phosphorus or boron.

11. The power storage device according to claim 6, wherein a diameter of one of the crystalline silicon protrusions near its root in the second region is 1 µm to 2 µm.

12. The power storage device according to claim 6, wherein a longest length of the crystalline silicon protrusions is 15 µm to 20 µm.

13. A power storage device comprising:
    a current collector comprising a metal element;
    a mixed layer comprising the metal element and silicon on the current collector;
    a metal oxide layer comprising the metal element on the mixed layer;
    an active material layer on the metal oxide layer, the active material layer having:
       a first region comprising crystalline silicon; and
       a second region comprising crystalline silicon protrusions on the first region, wherein the crystalline silicon protrusions continuously extend from the first region; and
    a conductive layer which is on and in contact with a surface of the second region of the active material layer.

14. The power storage device according to claim 13, wherein the metal element is selected form the group consisting of platinum, aluminum, copper, titanium, zirconium, titanium, hafnium, vanadium, niobium, tantalum, chromium, molybdenum, tungsten, cobalt, and nickel.

15. The power storage device according to claim 13, wherein a thickness of the conductive layer is greater than or equal to 0.1 nm and less than or equal to 10 nm.

16. The power storage device according to claim 13, wherein the conductive layer comprises one or more of copper, nickel, titanium, manganese, cobalt, and iron.

17. The power storage device according to claim 13, wherein the conductive layer comprises a second silicon layer containing phosphorus or boron.

18. The power storage device according to claim 13, wherein a diameter of one of the crystalline silicon protrusions near its root in the second region is 1 µm to 2 µm.

19. The power storage device according to claim 13, wherein a longest length of the crystalline silicon protrusions is 15 µm to 20 µm.

20. The power storage device according to claim 1, wherein a thickness of the conductive layer is greater than or equal to 0.1 nm and less than or equal to 10 nm.

21. The power storage device according to claim 1, wherein the current collector comprises at least one metal element selected form the group consisting of platinum, aluminum, copper, titanium, zirconium, titanium, hafnium, vanadium, niobium, tantalum, chromium, molybdenum, tungsten, cobalt, and nickel.

22. The power storage device according to claim 6, wherein the metal element is selected form the group consisting of platinum, aluminum, copper, titanium, zirconium, titanium, hafnium, vanadium, niobium, tantalum, chromium, molybdenum, tungsten, cobalt, and nickel.

* * * * *